United States Patent

[11] 3,610,398

| [72] | Inventor | Harold B. Rice<br>Walnut Creek, Calif. |
|---|---|---|
| [22] | Filed | July 29, 1969 |
| [45] | Patented | Oct. 5, 1971 |
| [73] | Assignee | John Burton Machine Corporation<br>Concord, Calif. |

[54] METHOD AND APPARATUS FOR DUMPING AND FILLING GENERALLY CYLINDRICAL CONTAINERS
8 Claims, 18 Drawing Figs.

| [52] | U.S. Cl. | 198/33 AD,<br>198/33, 141/168, 141/171, 141/181 |
|---|---|---|
| [51] | Int. Cl. | B65g 47/24 |
| [50] | Field of Search | 198/33, 33<br>R; 214/1 R, 340; 141/171, 168, 181 |

[56] References Cited
UNITED STATES PATENTS

| 2,669,364 | 2/1954 | Aronson | 214/1 R |
| 2,734,619 | 2/1956 | Labombarde | 198/33 R |
| 2,793,659 | 5/1957 | Guerard, Jr. et al. | 198/33 R |
| 2,856,058 | 10/1958 | Todd et al. | 198/33 R |

*Primary Examiner*—Harvey C. Hornsby
*Assistant Examiner*—Merle F. Maffei
*Attorney*—Gordon Wood ABSTRACT: Method and apparatus for dumping the contents of generally cylindrical containers such as barrels and drums and which may also be employed for filling such containers. As specifically applied to barrels, such as whiskey barrels, conveyor means is provided for carrying the barrels along a generally horizontal path of travel and simultaneously orienting the barrels with the bunghole of each barrel in a predetermined position relative to vertical. Thereafter the contents of the container are removed at a high speed or, alternatively, the container may be filled.

PATENTED OCT 5 1971

3,610,398

INVENTOR.
HAROLD B. RICE
BY
Gordon Wood
ATTORNEY

INVENTOR.
HAROLD B. RICE
BY
Gordon Wood
ATTORNEY

INVENTOR.
HAROLD B. RICE
BY Gordon Wood.
ATTORNEY

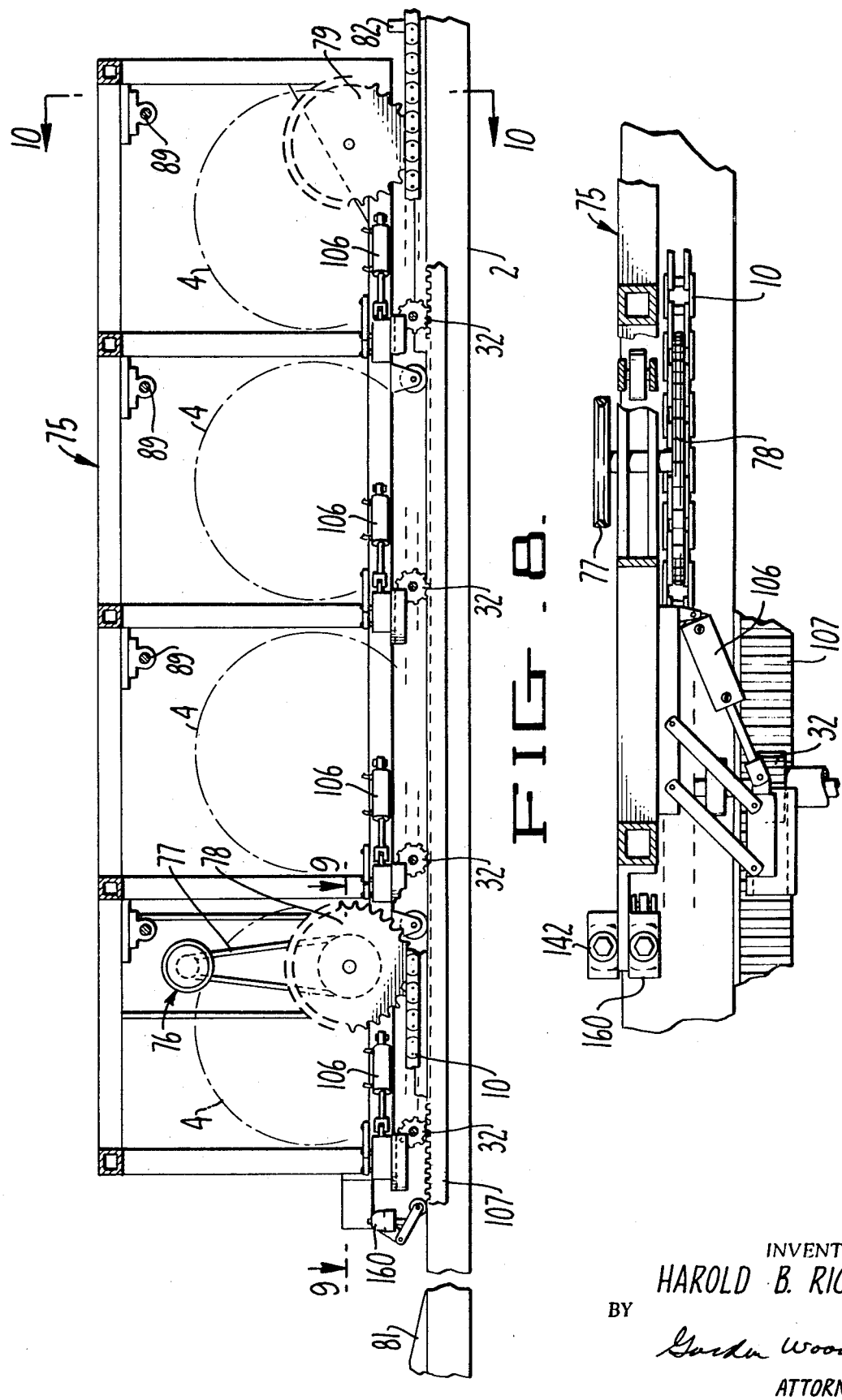

INVENTOR.
HAROLD B. RICE
BY Gordon Wood
ATTORNEY

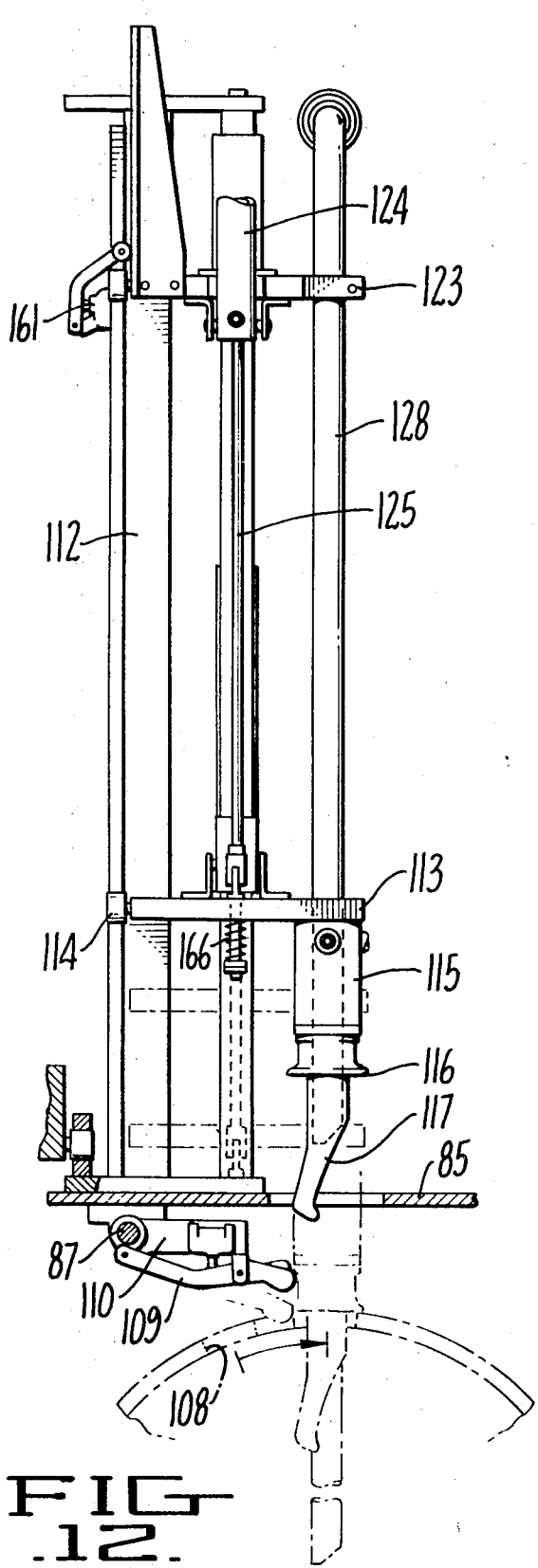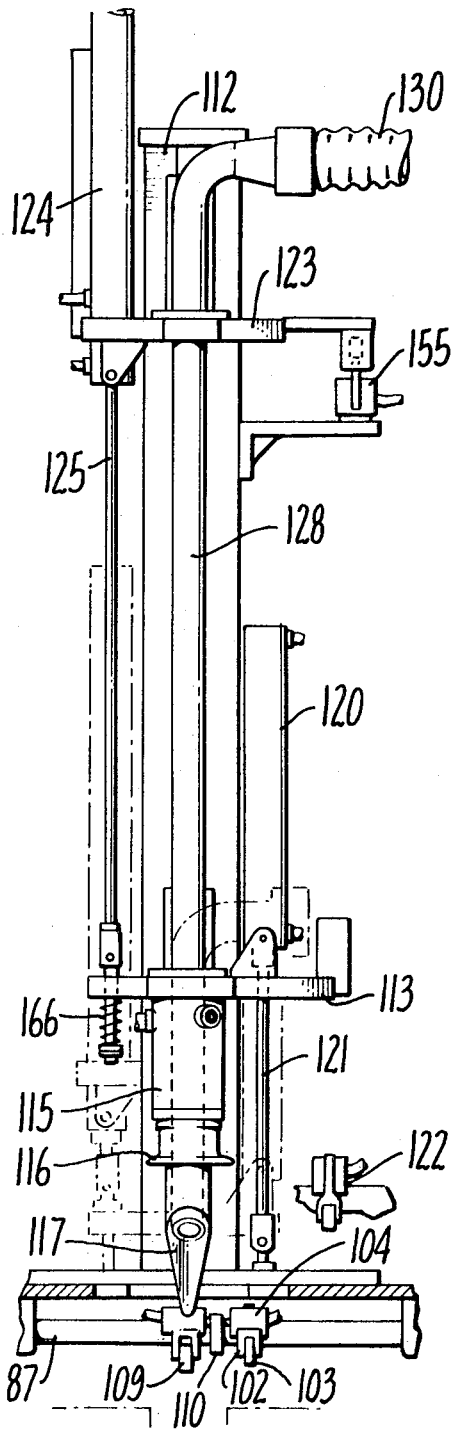
FIG.12.
FIG.13.
INVENTOR.
HAROLD B. RICE
BY Gordon Wood
ATTORNEY

INVENTOR.
HAROLD B. RICE

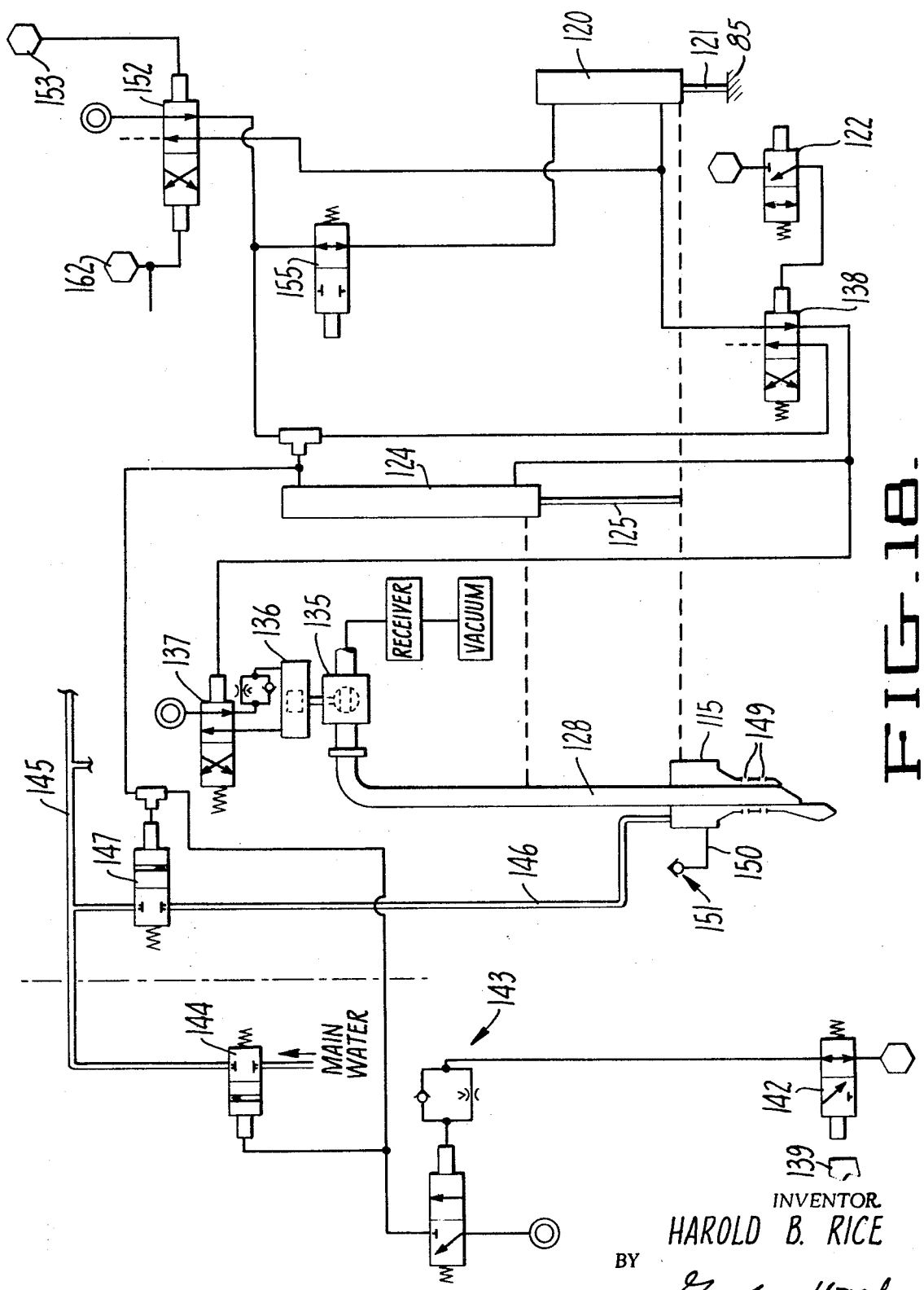

3,610,398

1

METHOD AND APPARATUS FOR DUMPING AND FILLING GENERALLY CYLINDRICAL CONTAINERS

This invention relates to a method and apparatus for emptying the contents of generally cylindrical containers such as whiskey barrels and drums. As will be seen later on the invention also lends itself to a filling operation for such containers.

Heretofore the operation of dumping the contents of whiskey barrels after such barrels have undergone the required period of storage has usually been performed by an almost entirely manual operation. Specifically in the case of whiskey barrels the procedure has been to roll the barrels along a pair of tracks to a dumping trough at which point the bung is removed from the bunghole and the barrel then rolled about a half a turn to a position with the bunghole down so that the contents are emptied by gravity. Since the bunghole is the only aperture in a whiskey barrel, venting of the barrel is not possible by this method and therefore the actual emptying operation requires a considerable length of time. Furthermore the procedure of dumping the whiskey into an open trough is extremely insanitary since it is possible for foreign objects including dirt and debris to fall into the trough along which the whiskey is conveyed to the next operation.

The main object of the present invention is the provision of a method and apparatus for dumping whiskey barrels and like containers in an improved manner over the prior art.

Another object of the invention is the provision of a method and apparatus for dumping or filling generally cylindrical containers such as barrels and drums and which method and apparatus permit the elimination of substantially all manual operations heretofore required.

Still another object of the invention is the provision of a conveyor for handling generally cylindrical containers such as barrels and drums in a substantially automated manner.

Another object of the invention is the provision of a unique barrel or drum support cradle which facilitates the handling of the container and also lends itself to a spotting function by which the container is readily oriented relative to the aperture therein which is usually in the arcuate sidewalls of the container.

Another object of the invention is the provision of a spotting device for barrels and drums providing an effective means for orienting the container relative to a predetermined reference element such as the bunghole in the barrel.

Another object of the invention is the provision of an effective barrel dumping and filling means which is adapted to be employed in connection with an elongated conveyor in such a manner as to permit the carrying out of the dumping and filling operations without stopping the conveyor.

Another object of the invention is the provision of a barrel dumping apparatus which lends itself to the high-speed dumping of a plurality of barrels at one time.

The present invention is also an improvement over U.S. Pat. No. 3,348,734 of Oct. 24, 1967.

Other objects and advantages will be apparent from the following specification and from the drawings;

FIG. 8 is a longitudinal section through the carriage.

FIG. 9 is a greatly enlarged horizontal section of the carriage taken in a plane indicated by lines 9—9 of FIG. 8.

2

Figure 11:
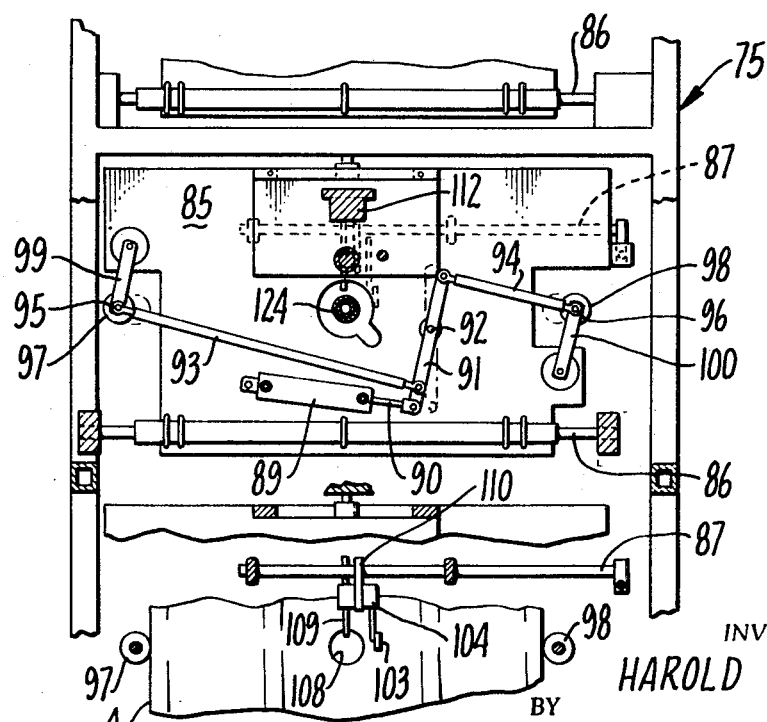

FIG. 11 is a top plan view of one of the carriage platforms.

FIG. 12 is a longitudinal sectional view through one of the carriage platforms showing the barrel-sensing means, the bunghole-sensing means, and the suction tube.

FIG. 13 is a view similar to FIG. 12 but taken at right angles thereto.

Figure 14:
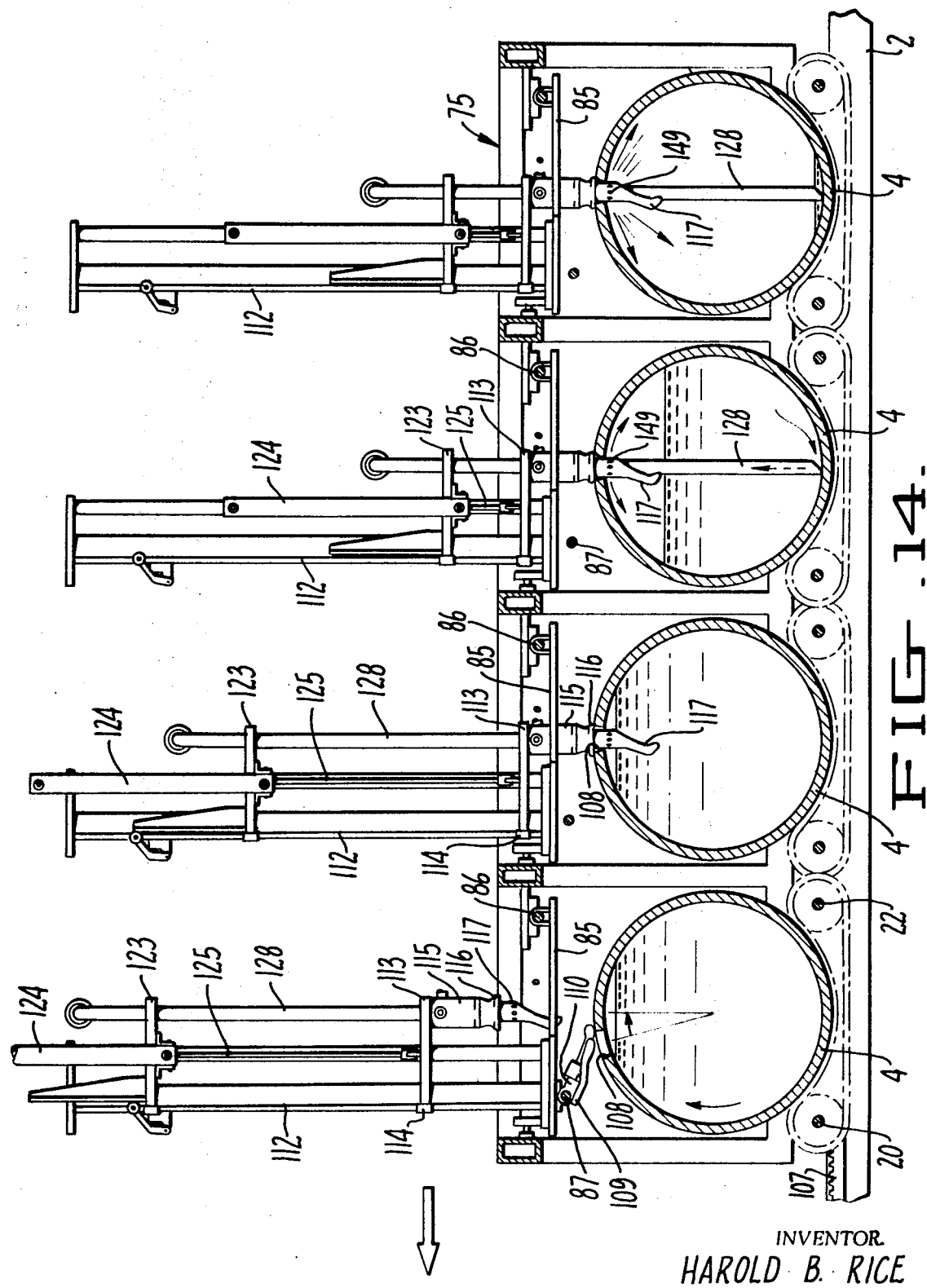

FIG. 14 is a longitudinal sectional view through the conveyor showing schematically the various operations performed while the apparatus is being employed as a barrel dumper.

FIGS. 15 to 18 are schematic arrangements of the fluid control system.

For convenience the invention will be described in detail with reference to three main features thereof. These are:

1. The conveyor
2. The spotter
3. The evacuator or filler

The present invention includes an extremely effective conveyor for relatively heavy generally cylindrical containers such as barrels and drums. The invention will be described with respect to the operation of dumping whiskey barrels but it will be apparent that it is equally applicable to the operation of dumping oil drums and other generally cylindrical containers. Furthermore it will also be understood that certain features of the present invention are applicable to a container-filling operation as well as a container-emptying operation.

The conveyor comprises a pair of horizontally disposed longitudinally extending side frame members 1, 2 which are supported on legs 3 at spaced points along the length of the conveyor. Barrels indicated at 4 may be gravity fed to the conveyor on rails 5 or in any other suitable manner.

Figure 2:
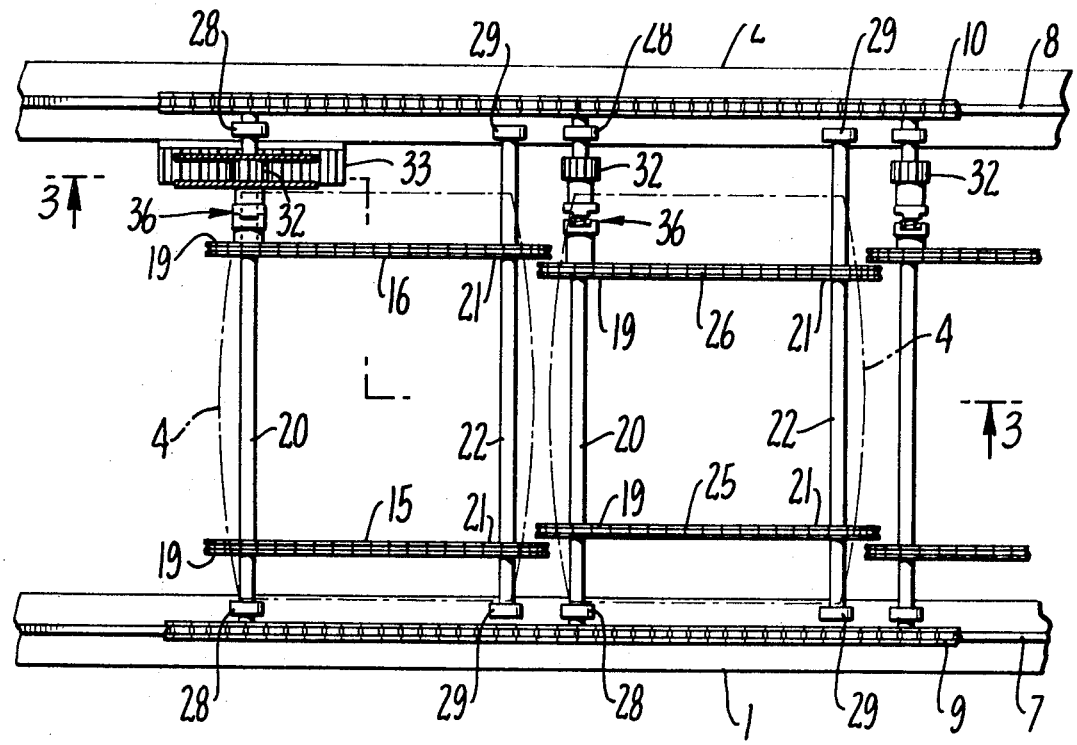
FIG. 2 is a typical plan view of a portion of the conveyor.

As best seen in FIG. 2 each side frame member 1, 2 is provided with a longitudinally extending runner 7, 8 respectively on which is slidably supported the upper runs of chains 9, 10.

Figure 1:
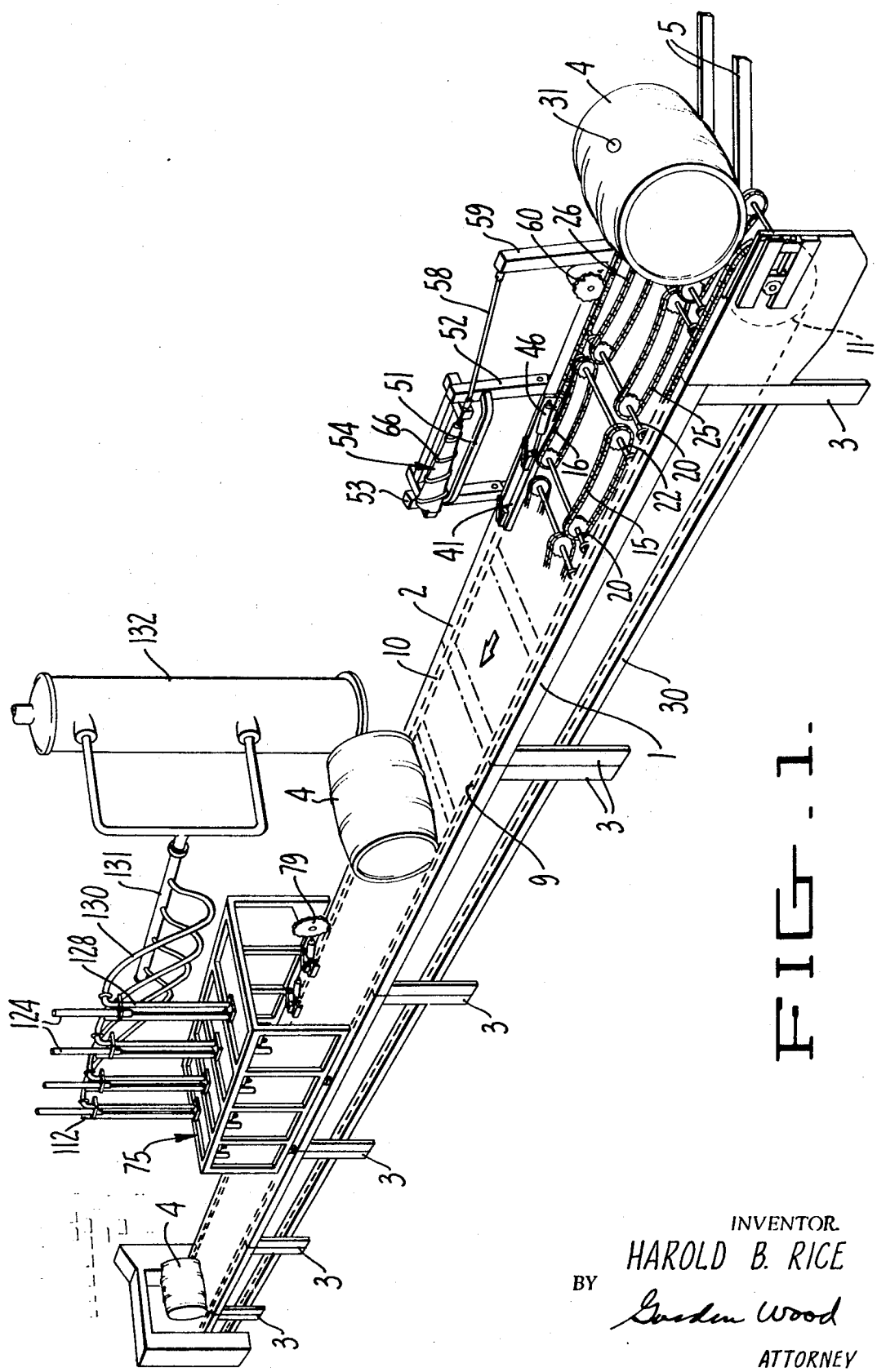
FIG. 1 is a perspective of the apparatus of the present invention.

In FIG. 1 only the rear end of the conveyor is shown and it will be understood that the forward end includes drive sprockets driven by a suitable source of power (not shown) for driving the chains 9, 10 at a uniform rate of speed from the rear end to the forward end of the conveyor. One of the idler sprockets at the rear end of the conveyor is indicated at 11 in FIG. 1.

Each barrel 4 is supported on a cradle which comprises a pair of closed loops of a flexible element, preferably a chain. In FIG. 2 a pair of loops 15, 16 are reeved around forward sprockets 19 (FIG. 3) carried by shaft 20 and at their trailing ends are reeved around sprockets 21 carried by shaft 22. In order to permit the barrels on the conveyor to be positioned as closely as possible the adjacent cradle is formed by a pair of loops 25, 26 which are positioned slightly inwardly of loops 15, 16 as best seen in FIG. 2. Said loops 25, 26 are similarly reeved around forward sprockets 19 and rear sprockets 21.

The forward shafts 20 are connected at their opposite ends to corresponding links on the chains 9, 10 so that said shafts 20 are translated at the same speed as said chains. Inwardly of the chains 9, 10 the forward shafts 20 are provided with rollers 28 in rolling engagement with the upper surfaces of the main frame numbers 1, 2. The trailing shafts 22 are similarly provided with rollers 29 at their opposite ends but are not connected to the chains 9, 10. By this arrangement, when the barrel is placed on the cradle the distance between shafts 20, 22 is not fixed and the upper runs of the loops 15, 16 can conform to the arcuate periphery of the container so that the tension in the lower run of each loop increases. It has been found that the use of a flexible element such as a chain to form the cradle loops not only provides optimum support for the containers but also facilitates handling and spotting the containers so as to permit orientation of the latter relative to the bungholes in the case of barrels.

Figure 3:
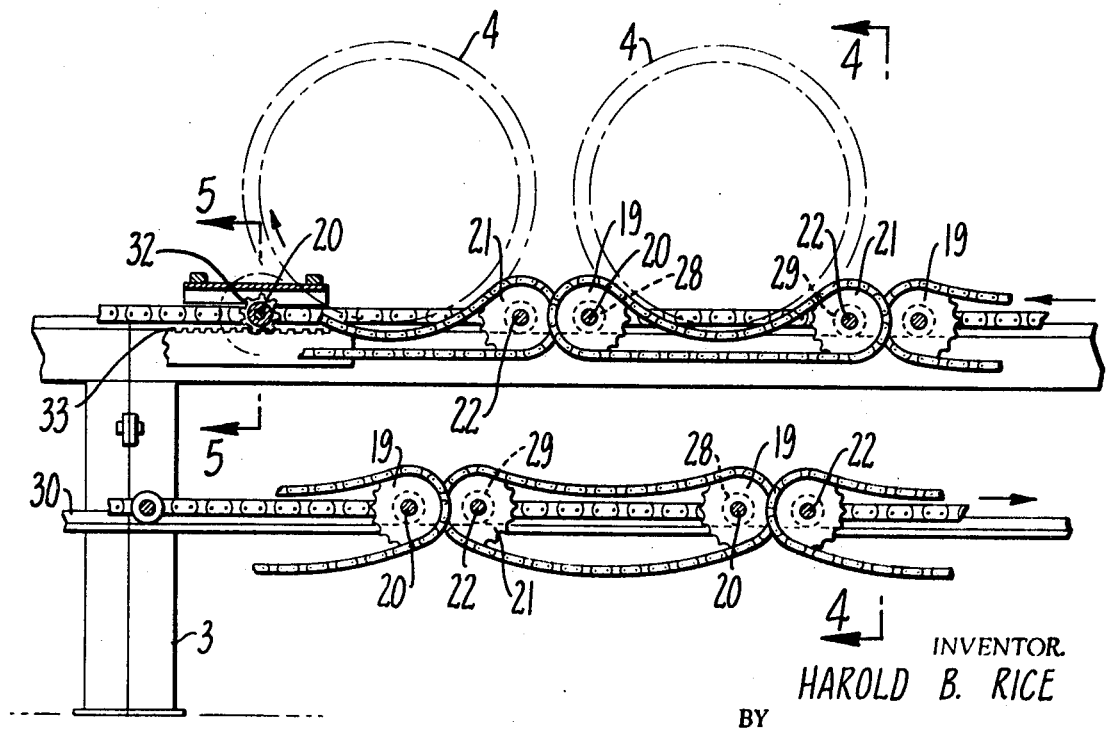
FIG. 3 is a longitudinal vertical fragmentary section of the conveyor as taken in a plane indicated by lines 3—3 of FIG. 2.

The lower run of the conveyor is seen in FIG. 3 and the same is supported on rails 30 secured to the legs 3. The above-described structure also ensures similar handling of all containers regardless of wide deviations in the actual shape of such containers. This is a particularly important consideration in barrels as opposed to drums.

SPOTTER

Figure 5:
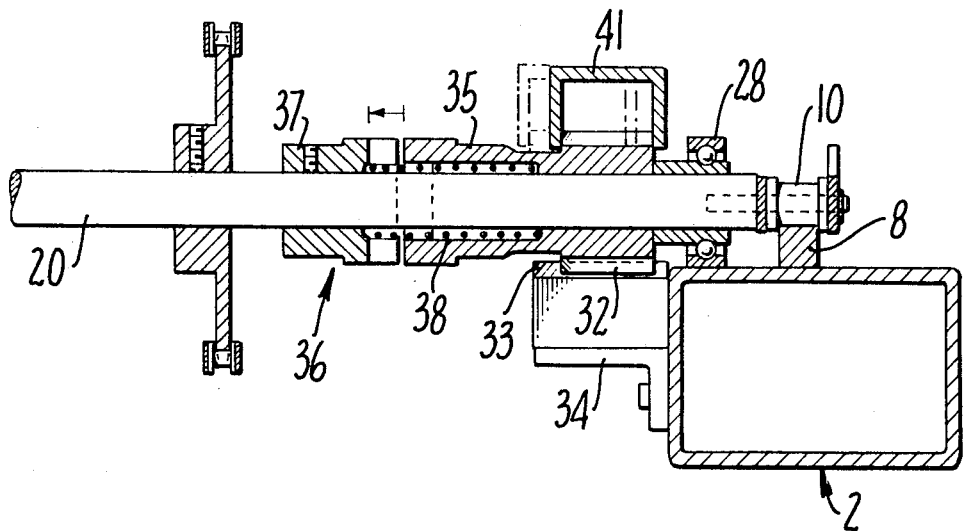
FIG. 5 is a greatly enlarged fragmentary cross-sectional view through the conveyor as taken in a plane indicated by lines 5—5 of FIG. 3 and showing the operation of the clutch means.

The barrels 4 are fed to the conveyor, as seen in FIG. 1, without regard to the position of the bunghole 31 which is the only aperture in the container through which the contents may be dumped or filled. The first step of the present invention after the barrels have been supported on their respective cradles is to orient the barrels so that the bunghole 31 of each is in a predetermined position relative to the vertical. Each shaft 20 is provided with a pinion 32, which at the spotting station, is in mesh with a rack 33 supported along the inner side of the frame members 1, 2 by means of suitable supports 34. As best seen in FIG. 5 each pinion 32 is fixedly secured to the movable side 35 of a clutch generally designated 36. The clutch 36 includes a fixed side 37 carried by each shaft 20 so that rotation of shaft 20 does not take place until the sides 35, 37 of clutch 36 are in engagement. Said opposite sides of the clutch are normally held out of engagement by means of compression spring 38.

Figure 6:
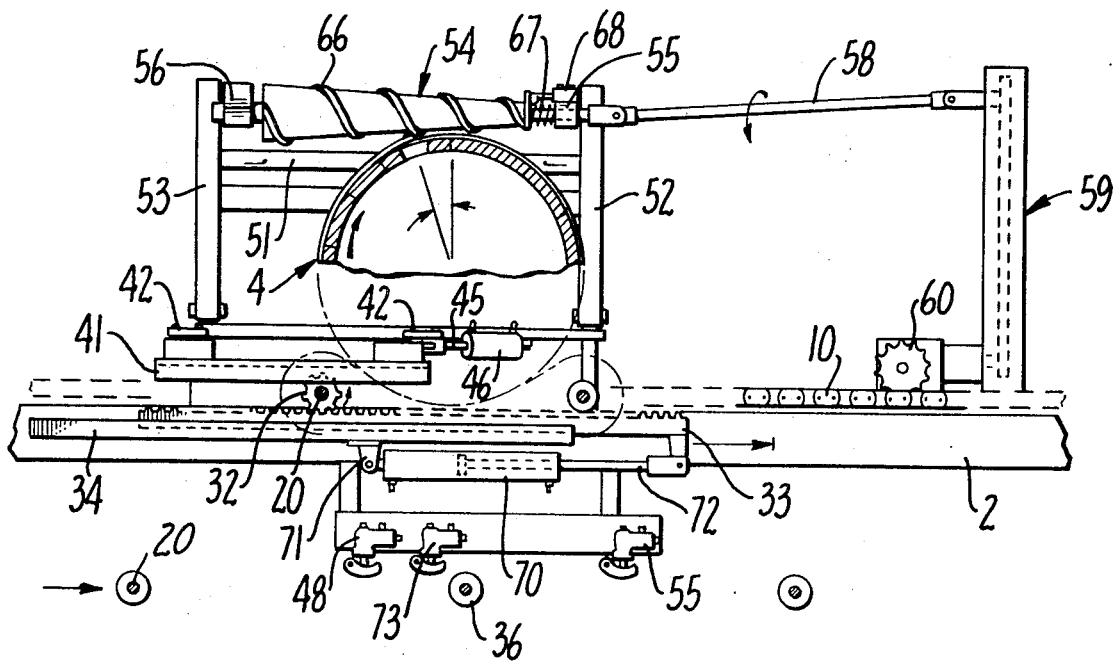
FIG. 6 is a side elevation of the spotting device.
Figure 7:
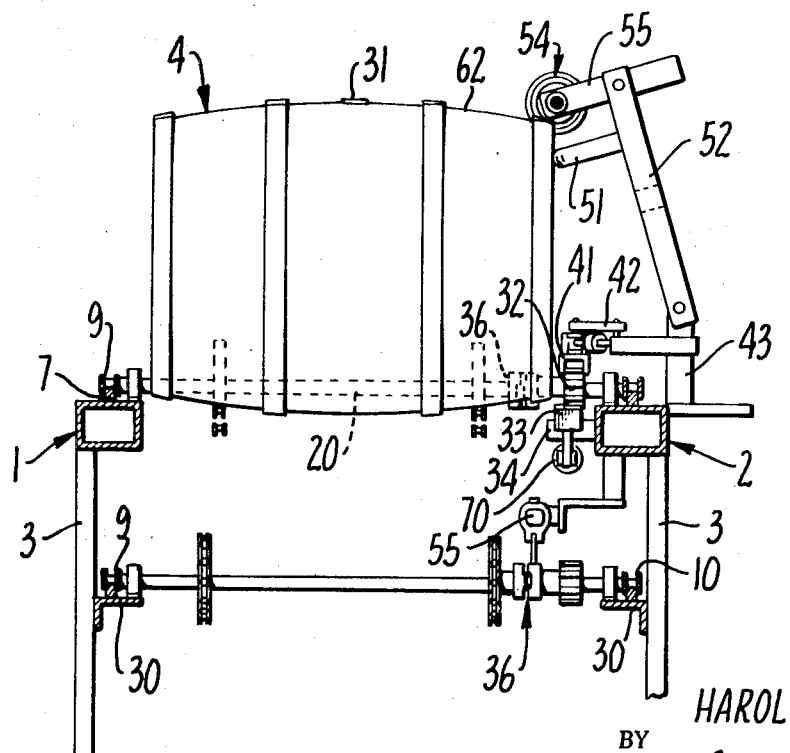
FIG. 7 is a transverse cross-sectional view through the conveyor showing the spotter.

Supported above pinion 32 and in slidable engagement with the opposite sides thereof is a downwardly opening channel 41 connected by a parallelogram linkage 42 to fixed supports 43 on frame member 2 (FIGS. 6, 7). The channel 41 and its linkage 42 are pivotally connected to the outer end of a connecting 45 rod of pneumatic cylinder 46. Referring to FIG. 6, when the forward shaft of a cradle of the lower run of the conveyor engages valve 48 cylinder 46 is extended to shift the channel 41 from the full-line position of FIG. 5 to the dotted line position thereby engaging clutch 36. This results in the shaft 20 being rotated in a counterclockwise direction due to the traction between the cradle loops 15, 16 and the arcuate periphery of said barrel.

As each barrel approaches the spotting station the right-hand side of the barrel (assuming one is looking toward the forward end of the conveyor) engages a runner or guide 51 (FIGS. 1, 7). This guide 51 is fixedly secured at its opposite ends to a pair of standards 52, 53 which form a generally upward extending frame for a spotting screw 54. This screw 54 is rotatably supported at its opposite ends in bearings 55, 56 carried by standards 52, 53 respectively.

Spotting screw 54 is rotated by shaft 58 (FIG. 6) having universal joint connections at its opposite ends and connected by a drive mechanism generally designated 59 with a sprocket 60 which is in mesh with chain 10. By this structure the spotting screw 54 is rotated at a speed proportional to the linear speed of chains 9, 10. As best seen in FIG. 7 the guide 51 is positioned relative to the screw 54 so that the latter engages one end of the barrel 4 as best seen in FIG. 7.

Figure 4:
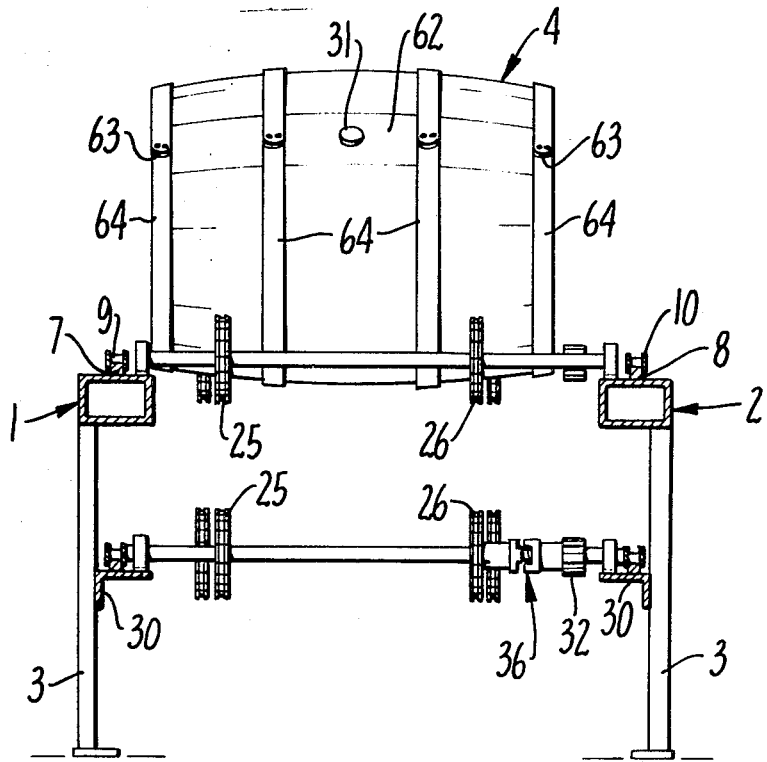
FIG. 4 is a typical transverse cross-sectional view through the conveyor and similar to the view taken in a plane indicated by lines 4—4 of FIG. 3.

At this point it should be noted that in the manufacture of barrels such as the one indicated in FIG. 7, the bung 31 is located in a bung stave 62 (FIG. 4) and which bung stave is also the one employed to receive the lap joint 63 by which the hoops 64 are secured to the barrel. This uniformity of construction of whiskey barrels permits the lap joint 63 to be employed for sensing the position of the bunghole 31. It will be understood of course that in other constructions such as in oil drums the aperture in the sidewalls of such drums may be employed as a sensing element.

Referring to FIG. 6 it will be seen that the clockwise rotation of the barrel 4 causes the lap joint 63 or the rivets securing the same to the bung stave to be brought into engagement with the helix 66 on spotting screw 54. Said helix may be formed to a fairly sharp edge so as to be readily engaged by the end of the lap joint or by the rivets. At any rate the arrangement shown in FIG. 6 is such that when the bunghole is about 15° to 20° offset from the vertical the helix 66 on the spotting screw 54 is engaged thereby causing the screw 54 to be urged along its axis to the right. A compression spring 67 is employed to urge the spotting screw 54 to the left at all times as seen in FIG. 6 and upon movement of the screw to the right under the urgency of the barrel hoop end a valve 68 is actuated by said screw which, as will be seen later, causes the shifter cylinder 46 to reverse and disengage the clutch 36. This results in rotation of the barrel being stopped when the bunghole is in a predetermined position relative to the vertical.

In order to perform the spotting operation in as short a distance as possible the speed of rotation of the forward shaft 20 is increased over that speed obtainable from movement of the conveyor chain 10 alone. This is accomplished by rapidly moving the rack 33 to the right as seen in FIG. 6 by means of a fluid driven cylinder 70. One end of cylinder 70 is fixedly secured as indicated at 71 to the conveyor frame and the other end of its connecting rod 72 is connected to one end of rack 33.

As seen in FIG. 6 a valve 73 is actuated by the lower run of the main conveyor immediately after the actuation of the clutch shifting valve 48 hereinbefore referred to. The actuation of valve 73 in turn actuates valve 74 (FIG. 15) which causes extension of the piston rod 72 of cylinder 70 thereby moving the rack 33 to the right so as to speed the rotation of forward shaft 20 and of course the rotation of barrel 4. As will be seen later in connection with the fluid control system the rack 33 is returned to its original position to await the next barrel after the spotting operation has been performed.

The use of the generally conical helix on spotting screw 54 is required because it is necessary that the element which stops rotation of the barrel be moving at the same absolute speed as the speed of the barrel. For this reason the pitch of helix 66 when divided into the pitch of the cradles must result in a whole number.

EVACUATOR OR FILLER

After the barrels have been spotted with their bungholes approximately 15° to 20° on the forward side of vertical they proceed to the barrel dumping station which includes a wheeled carriage generally designated 75 in FIG. 1. As stated before an important feature of the present invention resides in the fact that the barrel conveyor proceeds at a uniform speed at all times. In order to achieve this feature it is necessary that the carriage 75 be driven by the conveyor during the barrel dumping operation. By the present invention the carriage 75 is moved rapidly from its forward position shown in FIG. 1 to a rearward position toward the tail end of the conveyor. This is done by an air motor indicated at 76 in FIG. 8 of the type having a normally engaged brake. Said air motor is mounted adjacent the forward end of the carriage 75 and through a belt 77 drives a relatively large sprocket wheel 78 rotatably supported on carriage 75 and in mesh with the chain 10. In order to avoid cocking of the carriage 75 relative to the conveyor frame an idler sprocket 79 is also rotatably supported on carriage 75 at the rear end thereof and in mesh with chain 10.

A cam 81 (FIG. 16) attached to the conveyor frame is employed to actuate air motor 76 at a predetermined point relative to a group of barrels. In the particular structure disclosed the carriage 75 is adapted to receive four barrels and upon actuation of the air motor 76 the carriage 75 moves at a fairly high rate of speed from the forward position shown in FIG. 1 to a rearward position at which it is in registration with four barrels on the conveyor. A stop 82 is employed to shut off air motor 76 and thus hold the carriage 75 in a fixed position relative to the chains 9, 10.

Figure 10:
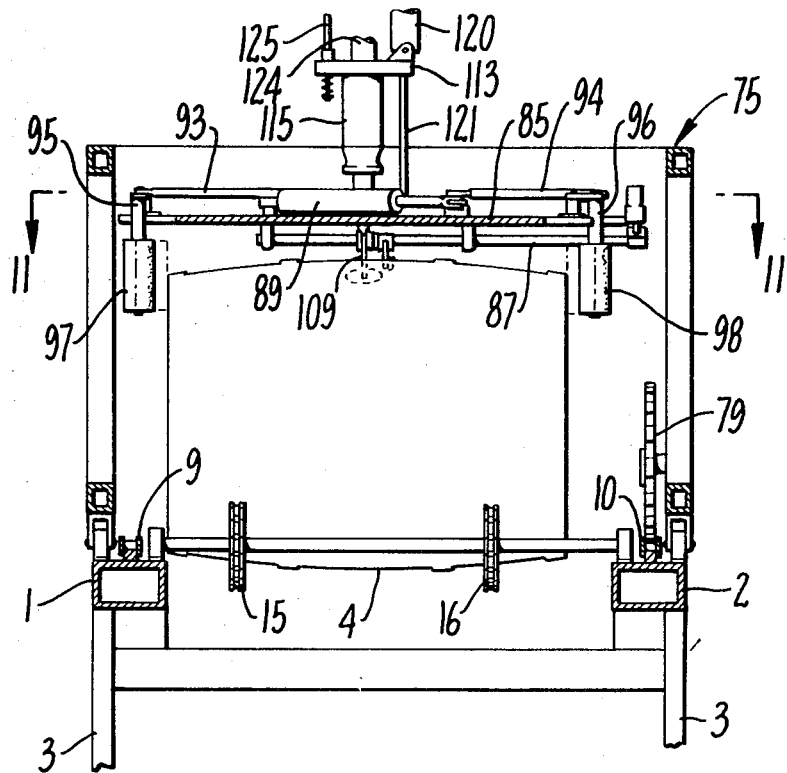
FIG. 10 is a transverse cross-sectional view through the carriage and conveyor.

Mounted on carriage 75 at each of the four barrel dumping stations is a horizontally disposed support plate 85 supported for shiftable movement transversely of the conveyor on rods 86, 87 carried by carriage 75. (FIGS. 10, 11)

Support plates 85 each carry barrel dumping apparatus including a suction tube which is moved vertically downwardly into the bunghole of the barrel and for this reason it is necessary that the support plates 85 be shifted if required so that the suction tube is centered on the central transverse plane of the barrel that contains the bunghole. This is accomplished by means of a clamping linkage operated by an air cylinder 89 (FIG. 11). The outer end of the connecting rod 90 of cylinder 89 is pivotally connected to one end of a bar 91 pivotally supported intermediate its ends on pivot 92 carried by support plate 85. At equally spaced points from pivot 92 the bar 91 is pivotally connected to a pair of links 93, 94 which in turn are connected at their opposite ends with downwardly extending shafts 95, 96 which support vertically elongated rollers 97, 98 respectively. Also connected to the roller shafts 95, 96 are the corresponding ends of a pair of short links 99, 100 which are pivoted at their opposite ends to support plate 85 as seen in FIG. 11.

By the above-described structure upon actuation of cylinder 89, the linkage associated therewith causes the rollers 97, 98 to move inwardly thus engaging the opposite ends or heads of the barrel 4. The weight of the barrel 4 does not permit it to shift on the chain loops 15, 16 and 25, 26 and the result is that the support plate 85 shifts on the rods 86, 87 thereby centering the support plate relative to the central plane of the barrel containing the bunghole.

Before the above-described centering step takes place the presence of a barrel under the support plate 85 is first determined by a sensor comprising an elongated link 102 (FIG. 13) provided with a wheel 103 at its outer end and cooperating with a valve 104 which must be opened before certain subsequent steps can take place. This will be described more fully later on in connection with the schematic diagrams of the control system.

Upon actuation of the barrel sensing valve 104 a pneumatic cylinder 106 is energized to engage clutch 36 on the forward shaft 20 of the cradle so that a rack 107 drives said forward shaft 22 to rotate the barrel. In this manner the barrel is rotated in a clockwise direction as seen in FIG. 12 to bring the bunghole 108 into a vertical position. The presence of the bunghole is determined by a sensor 109 similar to the previously described sensor 102. When such sensor 109 falls downwardly into the bunghole it opens a valve 110 thus permitting certain steps to be carried out in a manner which will be explained later on.

Figure 17:
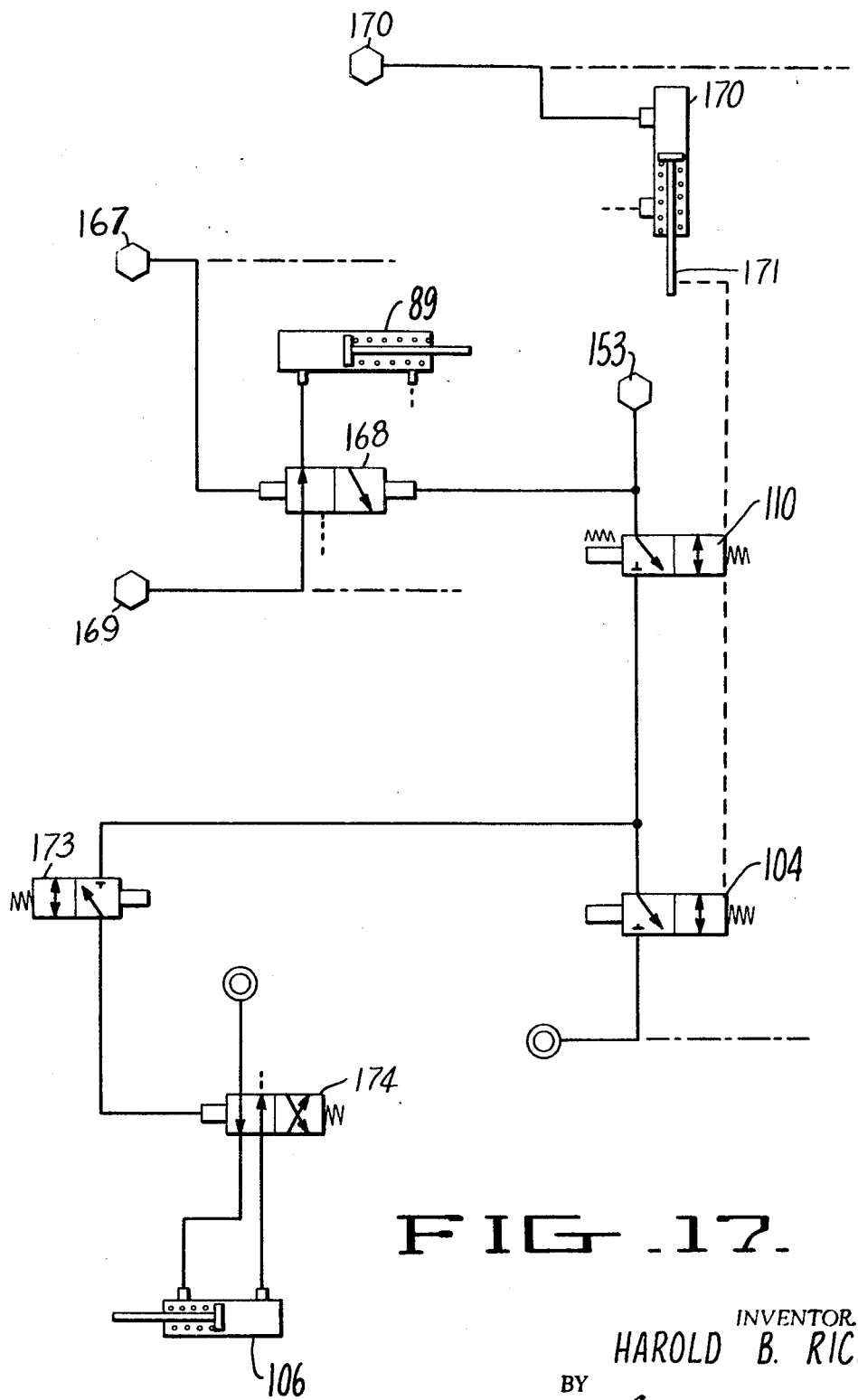

Secured at its lower end to support plate 85 and extending upwardly therefrom is a post 112 on which is slidably supported a relatively heavy plate 113 provided with cam rollers 114 cooperating with said post to permit movement of said plate vertically along the length of said post. Secured to the underside of plate 113 and extending downwardly therefrom is a bung seal housing 115 provided with a bung seal 116 at its lower end. Depending from bung seal 116 is a probe 117 which is adapted to engage the outer periphery of the barrel when it is lowered downwardly from the full-line position shown in FIG. 12. For the purpose of moving the probe plate 113 a vertically extending cylinder 120 is secured at its lower end to said probe plate 113 with its connecting rod 121 connected at its lower end to support plate 85. Upon introduction of air under pressure into the lower end of cylinder 120 it will be apparent that the probe plate 113 is driven downwardly to urge the probe 117 through the bunghole of the barrel. The shape of the probe 117 is best seen in FIG. 12 and said shape is such that, even if the probe engages the marginal portion of the bungstave around the bunghole it will tend to be urged into the bunghole and when it enters the hole the remainder of the probe is shaped so as to automatically center the probe relative to the bunghole. At this point it will be seen that the actual distance which the probe plate 113 moves downwardly will be determined by the girth of the barrel and the amount of deformation undergone by the bung seal 116. When the distance the probe plate travels downwardly indicates that it has entered the bunghole the probe plate actuates a valve 173 which cause clutch 36 to disengage and stop rotation of the barrel. (FIG. 17)

At a point spaced upwardly from probe plate 113 is a similar plate 123 which is supported for vertical movement along post 112 in a manner similar to probe plate 113. Fixed to suction tube plate 123 is the lower end of an elongated cylinder 124 having a connecting rod 125 secured at its lower end to the probe plate 113. When probe plate 113 has descended to its lowermost position it actuates a valve 122 which in turn causes the cylinder 124 to be energized so as to pull the suction tube plate 123 downwardly and along with it the suction tube 128 which is slidably received through the bungseal housing 115 and the cylindrical portion of probe 117. The operation of the suction tube 128 and the bungseal housing 115 is similar to that shown in U.S. Pat. No. 3,348,734 hereinbefore referred to. When the invention is employed as a barrel dumper the contents of the barrel are drawn through suction tube 128, flexible hose 130, manifold 131 and into receiver 132 which is maintained at all times at a negative pressure by vacuum pump means not shown.

Referring to FIG. 18, suction in the tube 128 is controlled by a valve 135 actuated by an actuator 136. The movement of actuator 136 to open valve 135 is effected by opening fourway valve 138 which in turn is opened by valve 122 responsive to he probe plate 113 in its down position. Since the downward movement of the suction tube is initiated at the same time it is seen that suction tube 128 commences the suction step as it is inserted into the barrel.

It will be noted that the emptying of the barrel proceeds as the carriage 75 is moving with the conveyor chains 9, 10. At a predetermined point on the frame water cam 139 engages the actuator of a valve 142 opening the latter to allow fluid flow to a timing valve 143 which in turn opens the main water valve 44 through which the water is conducted to a manifold 145 which in turn is connected at each barrel station to the bung seal housing 115 by means of conduits 146. Control of water flow to each barrel is regulated by valves 147 which are normally closed and are opened by the same signal that opens main valve 144 assuming that the suction tube is down. By this arrangement, after substantially all of the whiskey has been removed from the barrel, wear is introduced in the form of a spray through air holes 149 in bung seal housing 115 and in the manner disclosed in U.S. Pat. No. 3,348,734. Normal air venting of the barrel during suction may be accomplished through vent line 150 provided with a vacuum relief valve 151 which is adapted to be closed by water pressure in bung seal housing 115.

Also shown in FIG. 18 are the fluid circuits for probe cylinders 120 and suction tube cylinders 124. The introduction of air into the lower end of probe cylinder 120 is controlled by four-way valve 152 which is opened when the air pressure is received through a pilot line 153 when both the barrel-sensing valve 104 and the bung-sensing valve 110 are activated (See FIG. 17).

The same valve 138 which initiates the suction also controls the cylinder 124 and permits fluid to be introduced to the lower end of the latter, to insert the suction tube 128 into the barrel.

As a safety feature the upper end of probe plate cylinder 120 is connected through a valve 155 which is mechanically closed by the suction tube when the latter is down. Only when such suction tube is in its up position can probe plate cylinder 120 be actuated.

Figure 15:
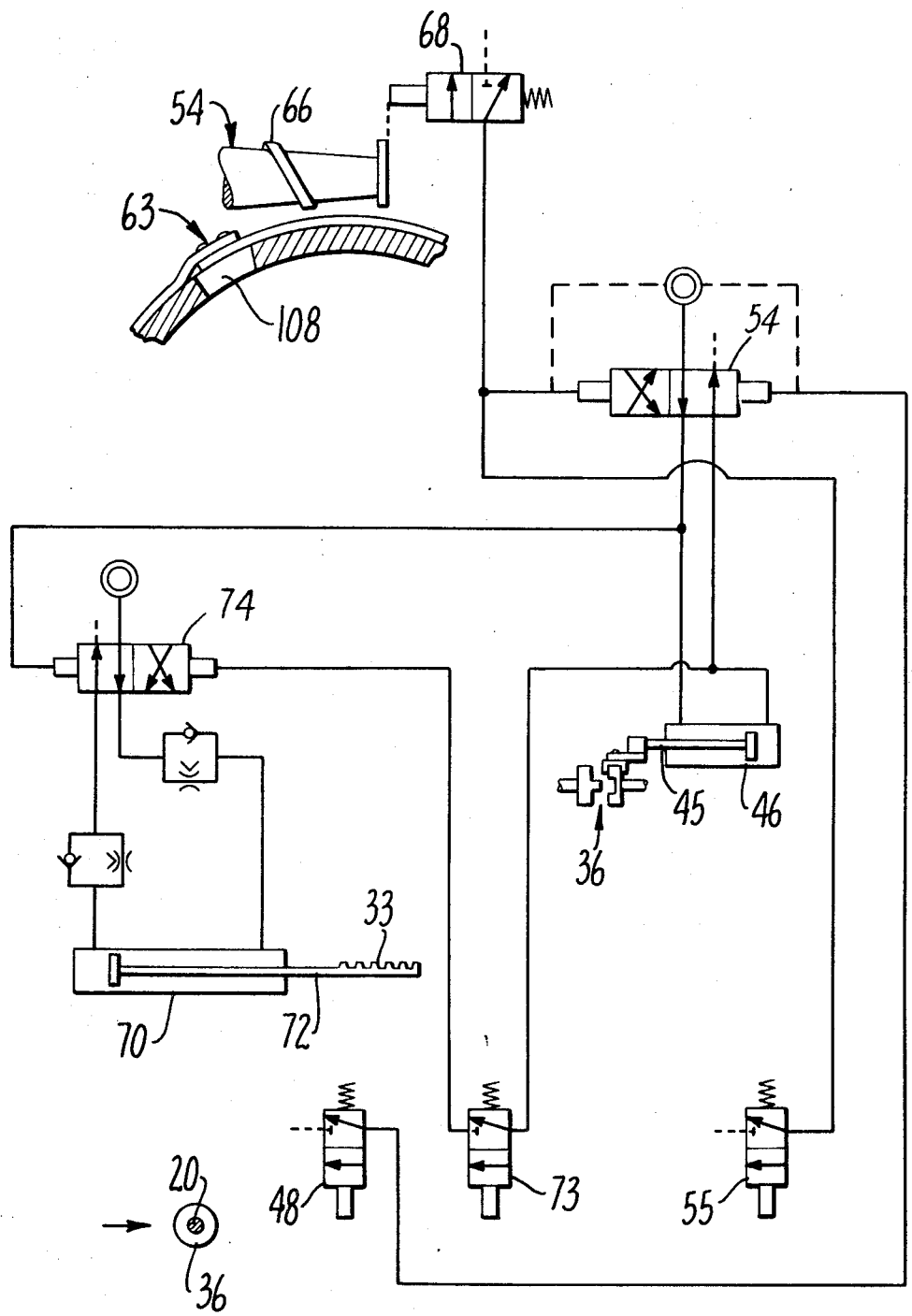

In the schematic drawing FIG. 15 most of the elements therein have already been described. After spotting of the barrel has been accomplished the lower run of the conveyor chain engages a normally closed valve 55 which bleeds the left-hand side of valve 54 insuring that both the clutch shifter cylinder 46 and rack moving cylinder 70 return to their original positions in readiness for the next barrel.

The operation of the air motor 76 described above is also seen in FIG. 16 wherein the cam 81 on the conveyor frame actuates valve 160 on the carriage so as to connect a sustained source of air pressure with four series-connected valves 161 located respectively on the support plates 85. Each of said valves 161 is adapted to be moved from its normally closed position to an open position by mechanical engagement with the suction tube plate when same has been retracted to its upper position. As pointed out before the probe plate cannot be retracted to its upper position until the suction tube is also elevated and for this reason the opening of all four valves 161 indicates that it is safe for the carriage to move to its rearward position to pick up four additional barrels. In this connection it will be noted that the sustained air source passing through valve 160 also supplies air under pressure to the pilot line 162 which, as best seen in FIG. 18, is employed to actuate the valves which cause the probe plate and suction tube to move to their upper position.

Figure 16:
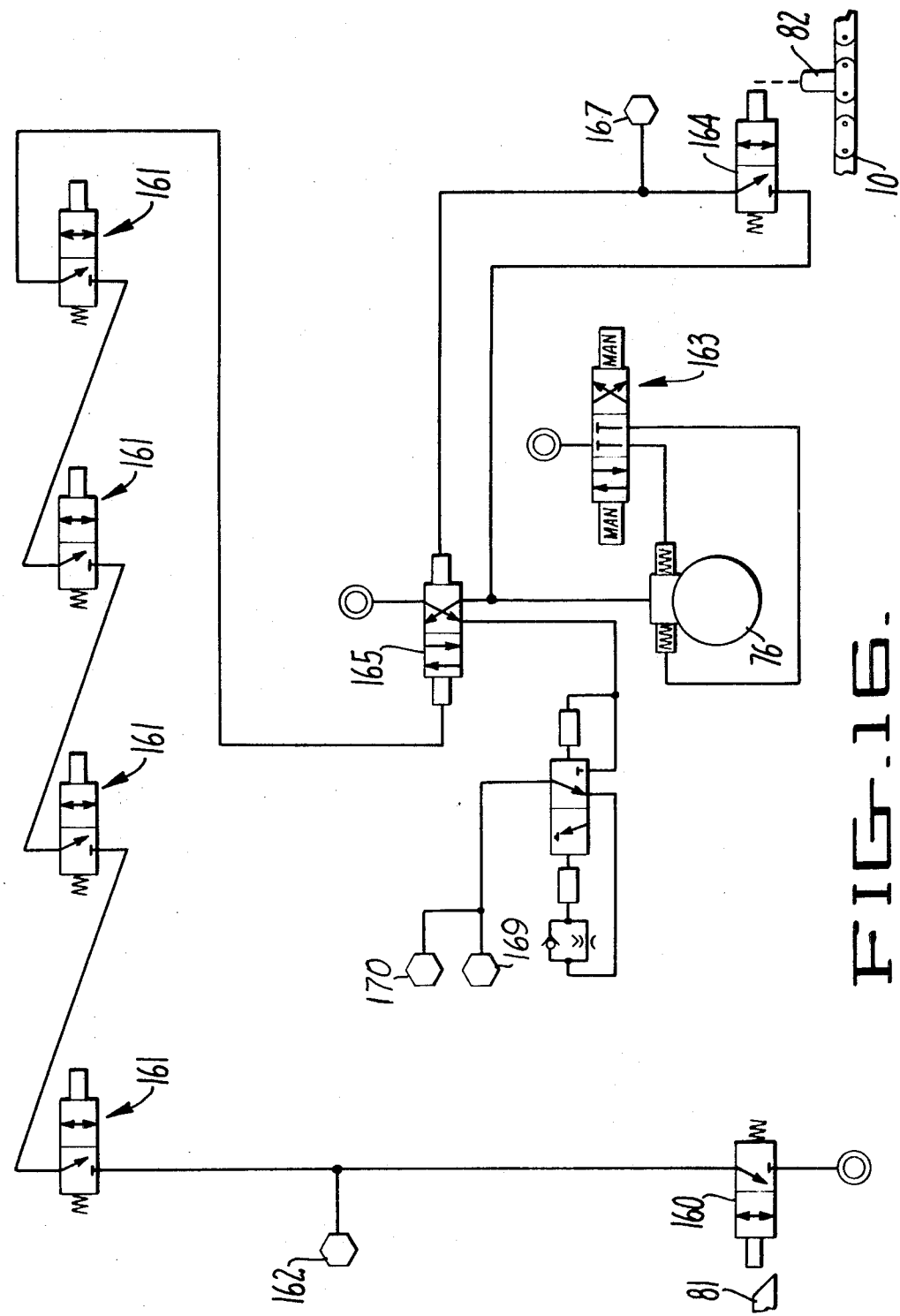

As seen in FIG. 16, the opening of cam-actuated valve 160 and the four series arranged valves 161 causes a valve 165 to be actuated to connect a sustained air source with the air motor 76 and drive it in a direction to move the carriage 75 rearwardly on the conveyor. It will be noted that the air motor 76 may be set for unidirectional rotation since under normal operation it is unnecessary to reverse the same. However, in order to permit such reversal manually when required a valve 163 is provided for this purpose.

The rearward motion of the carriage 75 on the conveyor is stopped at a predetermined point by engagement of valve 164 with a lug 82 on chain 10. This reverses the position of valve 165 and stops the air motor. As pointed out before, the air motor 76 is of the type having an automatically actuated brake when the air motor is not rotating. This has the effect of fixing the carriage relative to the chains 9, 10.

Actuation of valve 164 by lug 82 on chain 10 also has the effect of delivering air pressure to conduit 167 at the same time the air motor is stopped. This causes valve 168 (FIG. 17) to connect a time powered source 169 with barrel centering cylinder 89 to cause centering the support plate 85. Concurrently a time powered source through conduit 170 drives the connecting rod 171 of a cylinder 172 downwardly and with it the barrel and bung sensor apparatus previously described.

After the valves 104, 110 have been opened in response to the barrel and its centering valve 168 is returned to its previous condition and the valve 173, opened by mechanical engagement with the probe moving to its down position, causes the cylinder 106 to return to its normal position by the application of air pressure to its connecting rod end through valve 174.

In FIG. 14 the successive operations of the probe and the suction tube are illustrated at successive time intervals from left to right. It will be understood, however, that the emptying of all four barrels is performed simultaneously although obviously a greater or lesser number may be emptied in one operation.

The present invention also contemplates the provision of a pair of carriages on the conveyor for the purpose of handling different types of liquor. For example, one carriage may be employed to empty gin barrels and another may be employed to empty whiskey barrels. It will be understood of course that at one particular time only one of the carriages is employed.

It will also be noted that the present invention does no employ any electrical switching means which may cause arcing in the explosive atmosphere which is present in the above described operation.

It is emphasized that the present invention may be employed with substantially no change to permit a filling operation instead of the dumping operation shown in FIG. 14. Also with reference to FIG. 14 it will be noted that the suction tube 128 actually engages the bottom of the barrel in order to effect complete evacuation of the latter. In order to allow for slight differences in dimensions of the different barrels the maximum force allowable on the lower end of suction tube 128 is controlled by a compression spring 166 which is preloaded and interposed between the end of connecting rod 125 of suction tube cylinder 124 and the bottom of probe plate 113. By this arrangement the suction tube is prevented from striking the lower stave of the barrel with sufficient force to cause injury to the latter.

I claim:

1. In a conveyor for generally cylindrical objects such as barrels:
    a cradle formed by an elongated closed loop of a relatively flexible element disposed in a vertical plane to provide an upper run and a lower run,
    a driving member supported for movement along a generally horizontal path of travel,
    shaft means connecting one end of said loop with said driving member,
    a support extending along the length of said path, and
    wheeled means freely movable along said path floatingly supporting the opposite end of said loop for rolling movement along said support,
    a cylindrical object resting on said cradle with its axis transversely of the plane of said loop is supported on its arcuate periphery by the upper run of said element with the latter conforming to the contour of said periphery, and said wheeled means floatingly supporting said opposite end is free for movement toward and away from said one end to permit the automatic movement of said free end responsive to the particular weight and contour of said object.

2. A conveyor according to claim 1 wherein said element is a chain and said wheels are toothed to mesh with said chain.

3. A conveyor according to claim 1 wherein means is provided for rotating the shaft at said one end of the loop for driving said loop to rotate said object about its axis.

4. A conveyor according to claim 3 wherein said object is provided with a reference element and means is provided for stopping said rotating means when said reference element is in a predetermined position for spotting such object.

5. A spotter for a cylindrical object such as a barrel or drum having a spotting element comprising:
    an elongated flexible element engaging the lower side of such object for supporting the same with its axis substantially horizontal,
    means for translating said element along a path of travel at a uniform speed,
    means for driving said flexible element during said translation for rotating said object about its axis,
    sensing means for sensing the location of said spotting element at a predetermined position, and
    means responsive to said sensing means for stopping said rotating means.

6. A spotter according to claim 5 wherein said element is in the form of a closed loop and the opposite ends of said loop are reeved about wheels and the latter are supported on shafts, said driving means being operative to rotate one of said shafts.

7. A spotter according to claim 5 wherein means is provided for moving said object at a uniform speed along a path of travel during spotting of said object, and said sensing means includes a rotating screw formed at its periphery to engage said spotting element, the lead of said screw and its rotational speed being such as to give a feeding speed equal to the speed of said object in said path of travel.

8. In a dumping or filling apparatus for a generally cylindrical container having an aperture in its arcuate sidewall:
    conveyor means for moving said container along a generally horizontal path of travel in one direction at a uniform speed with its axis horizontal and transversely of said path,
    means for rotating said container about its axis to a position with said aperture directed upwardly,
    said rotating means being operative while said container is moving long said path at said uniform speed,
    a tube supported above said container for downward movement into said container through said aperture,
    a carriage movable with said conveyor means and supporting said tube,
    means for releasing said carriage from said conveyor means, and
    means for moving said carriage a predetermined distance in the opposite direction of said conveyor movement and connecting it with said conveyor means for movement therewith.